United States Patent [19]

Ho et al.

[11] 4,305,105
[45] Dec. 8, 1981

[54] LINEAR ACTUATOR FOR MAGNETIC DISC DRIVE AND THE LIKE

[75] Inventors: Bin L. Ho, Los Gatos; Charles Dong, San Jose, both of Calif.

[73] Assignee: Priam Corporation, San Jose, Calif.

[21] Appl. No.: 159,661

[22] Filed: Jun. 16, 1980

Related U.S. Application Data

[63] Continuation of Ser. No. 6,775, Jan. 26, 1979.

[51] Int. Cl.³ .......................... G11B 5/55; G11B 21/08
[52] U.S. Cl. ........................................ 360/106; 310/12
[58] Field of Search ............................ 360/106; 310/12

[56] References Cited
U.S. PATENT DOCUMENTS 3,886,595  5/1975  Swaim et al. ...................... 360/106

OTHER PUBLICATIONS

Giebeau et al., Linear Actuator, IBM Tech. Disc. Bull., vol. 13, No. 1, Jun. 1970, p. 63.

*Primary Examiner*—Robert S. Tupper
*Attorney, Agent, or Firm*—Flehr, Hohbach, Test

[57] ABSTRACT

A linear actuator for a magnetic disc drive has shortened magnetic flux lines totally confined within the actuator housing whereby the actuator can be placed in closer proximity to a disc and thus reduce the size of the disc drive package. The actuator includes a generally cylindrical housing with magnets attached to the inside surface of the housing. A cylindrical bobbin having a voice coil wound on its periphery is positioned within the housing and linearly movable therein with the voice coil in close proximity to the magnets. An annular magnetic flux transmission means is attached to one face of the housing and a flux transmission plate is attached to the opposite face of the housing with the flux transmission means providing magnetic flux paths and preventing flux leakage from the housing.

9 Claims, 4 Drawing Figures

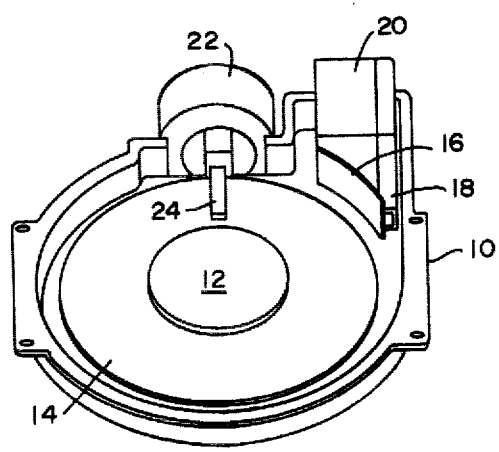
FIG.—1
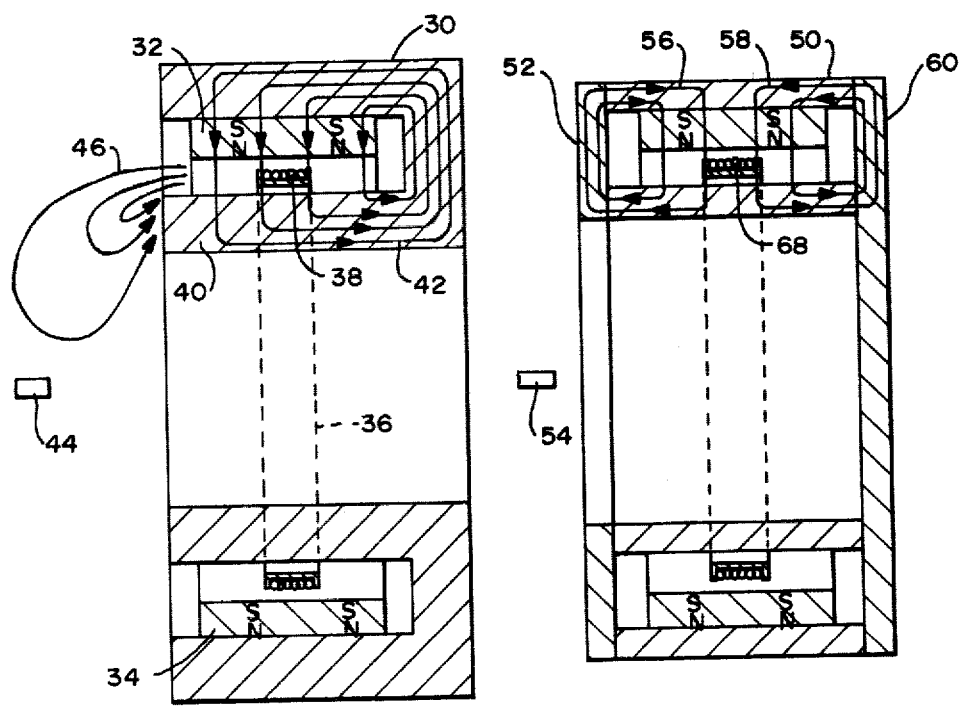
FIG.—2   FIG.—3

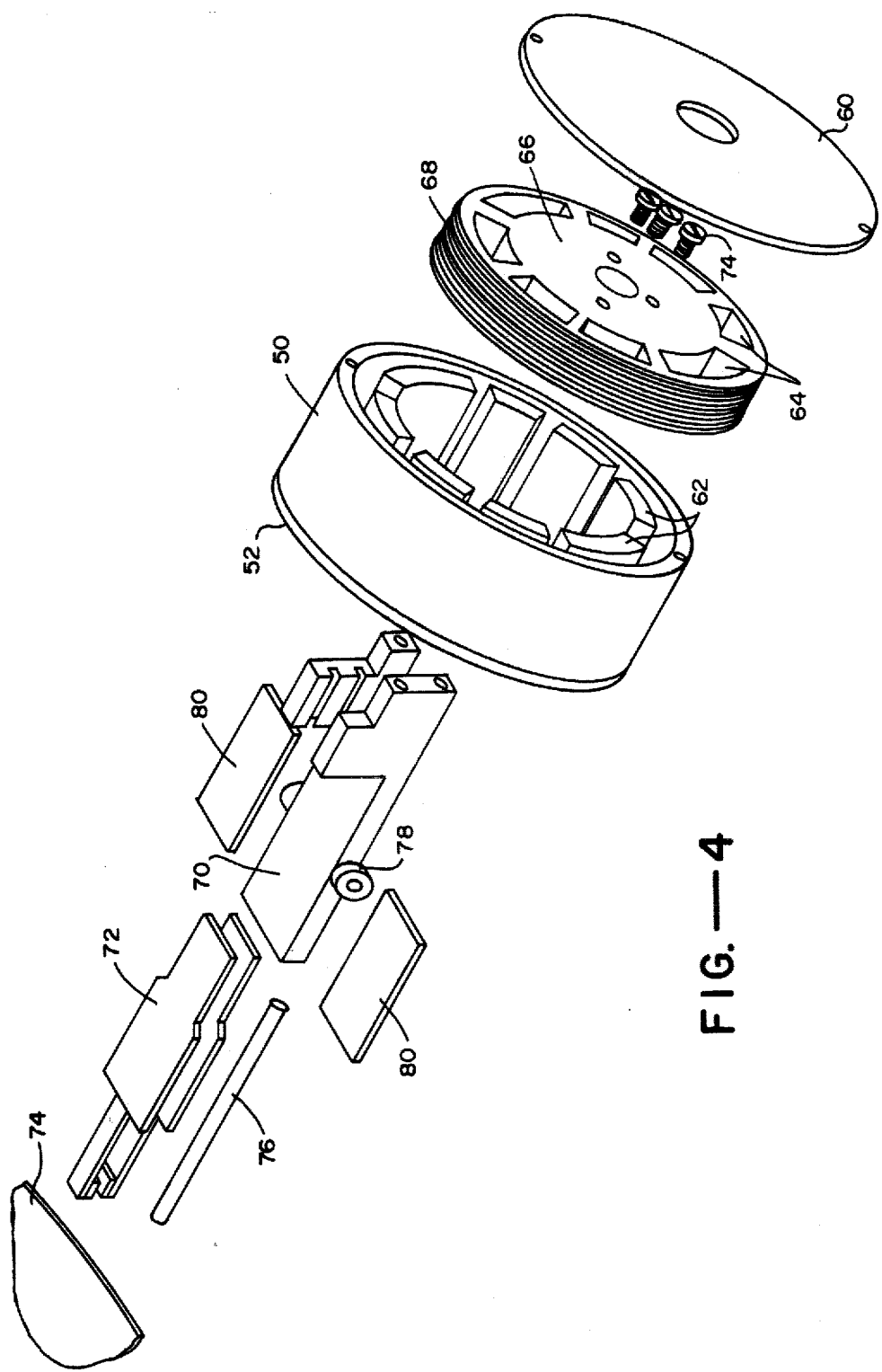
FIG.—4

LINEAR ACTUATOR FOR MAGNETIC DISC DRIVE AND THE LIKE

This is a continuation of application Ser. No. 6,775 filed Jan. 26, 1979.

This patent application is related to the following copending applications: "ENCLOSED DISC DRIVE WITH IMPROVED AIR FLOW", Ho and Bibby, Ser. No. 6,776, filed Jan. 26, 1979; "MANUFACTURING FIXTURE AND SUPPORT FOR MAGNETIC DISC", Ho and Guerini, Ser. No. 6,861, filed Jan. 26, 1979; and "LINEAR ACTUATOR INCLUDING LIMIT STOP ASSEMBLY", Ho and Guerini, Ser. No. 6,777, filed Jan. 26, 1979, and now U.S. Pat. No. 4,237,504.

This invention relates generally to magnetic disc drives, and more particularly the invention relates to linear actuators for moving pickup heads in a disc drive.

Discs having magnetic coatings on the surfaces thereof provide memories for bits of data which can be randomly accessed at high speed for either retrieving or storing data. Typically, heads having a small pickup coil are rapidly moved across the disc surfaces while the disc is spinning for detecting or storing data in concentric data tracks on the disc surfaces. The heads ride on a thin layer of air created by the spinning disc with the heads being in close proximity to but spaced from the disc surface.

To alleviate problems of contamination and alignment of read/write pickup heads, sealed disc drives have been introduced. These units house read/write heads and carriage, linear actuator for the carriage, drive motor and spindle, and magnetic discs which are sealed within the housing.

Size of the packaged disc drive is determined not only by the disc size but also by the linear actuator required for moving the read/write pickup heads. Linear actuators include a cylindrical housing with magnets mounted on the interior surface of the housing. A voice coil wound on a bobbin is positioned within the cylindrical housing with the voice coil in close proximity to the magnet assembly. By energizing the voice coil the bobbin will move linearly within the housing and thus move an attached carriage and pickup heads with respect to the surface of the disc.

Conventional linear actuators have an open face on the housing side which is adjacent to the disc, thus permitting some magnetic flux leakage from the magnet assembly. Consequently, the linear actuator must be spaced from the edge of the disc to prevent interference by the leakage flux with the magnetic recording on the disc surface. Some disc drives include a magnetic shield between the disc and linear actuator, but considerable spacing is still required to accommodate the shield, and the mechanical design of the disc drive package is complicated thereby.

An object of the present invention is an improved linear actuator for a magnetic disc drive.

Another object of the invention is a compact sealed disc drive.

Yet another object of the invention is a linear actuator for a disc drive which can be positioned in close proximity to a magnetic disc.

Still another object of the invention is a linear actuator having an improved magnetic flux path confined within the actuator.

Briefly, in accordance with the present invention, a linear actuator includes a generally cylindrical housing including a plurality of magnets mounted to the inside surface of the housing, a generally cylindrical bobbin including a coil wound on the periphery of the bobbin. The bobbin is positioned within the housing and is linearly moveable therein with the coil in close proximity to the plurality of magnets. A first magnetic flux transmission means is attached to one end of the housing in a peripheral portion of the housing to provide a path for magnetic flux within the housing and prevent magnetic flux leakage. A second magnetic flux transmission means is attached to the other end of the housing to provide a second magnetic flux path for the magnets and prevent magnetic flux leakage.

In a preferred embodiment the first magnetic flux transmission means comprises a ferrous annular ring attached to one end of the cylindrical housing near the perimeter of the housing. The second magnetic flux transmission means comprises a ferrous plate covering the other end of the cylindrical housing. Advantageously, guide means for supporting and guiding the linear movement of the bobbin may be provided within the cylindrical housing, supported by the first flux transmission means, and provide part of the magnetic flux path.

By providing a magnetic flux path completely within the cylindrical housing, leakage flux is minimized and the linear actuator can be positioned in close proximity to a disc drive, thus reducing the size of the disc drive enclosure.

The invention and objects and features thereof will be more readily apparent from the following detailed description and appended claims when taken with the drawings.

In the drawings,

FIG. 1 is a perspective view of a magnetic disc drive with the top cover removed.

FIG. 2 is a cross section view of a conventional linear actuator for disc drive and illustrates the flux path therein.

FIG. 3 is a section view of one embodiment of a linear actuator in accordance with the present invention and illustrates the flux path thereof.

FIG. 4 is an exploded perspective view of one embodiment of a linear actuator in accordance with the present invention.

Referring now to the drawings, FIG. 1 is a perspective view of a disc drive with the top cover removed to illustrate components thereof. The unit includes a bottom support 10 on which is mounted a drive motor (not shown) and spindle 12. Mounted on spindle 12 and rotated by the drive motor is a magnetic disc 14 which is sealed in the drive package. Air currents generated by the spinning disc are captured by a guide 16 and directed through a channel 18 to a filter 20 to maintain the cleanliness of the enclosed air.

Mounted to a peripheral portion of the support 10 is a linear actuator 22 which linearly moves a carriage 24 and magnetic heads mounted thereon across the surface of disc 14 while the disc is spinning for accessing and recording data in concentric data paths on the surface of disc 14. The linear actuator typically comprises a cylindrical housing having a plurality of magnets mounted on the interior surface thereof. Carriage 24 is attached to a voice coil within the cylindrical housing. The voice coil is positioned in close proximity to the magnet assembly, and energization of the coil linearly moves the voice coil support and attached actuator.

Referring to FIG. 2, a cross section view of a conventional voice coil actuator is illustrated in cross section. The actuator includes a cylindrical housing 30 with permanent magnets 32 and 34 mounted on the interior surface thereof with polarity as indicated. Positioned within the housing 30 is an annular support shown generally at 36 which includes a voice coil 38 wound around its periphery. The voice coil is positioned in close proximity to the permanent magnets 32, 34 and when energized is linearly driven with respect to the magnet.

The housing 30 is typically made of cast steel and includes an internal cylindrical portion 40 around which the voice coil is positioned whereby a magnetic flux path is established as indicated by the flux lines 42.

Because the housing is open on the side facing magnetic disc 44 to accommodate the voice coil and support, some leakage flux escapes from the actuator housing as indicated by the flux lines 46. This leakage current necessitates placement of the linear actuator housing away from the disc 44 to prevent interference by the leakage flux with the magnetic data recorded on the surface of the disc. In some conventional enclosed disc drives a shield is provided in the enclosure between the open face of the linear actuator and the disc to minimize the adverse effects of the leakage flux, but spacing of the actuator from the disc is still required to accommodate this shield. Moreover, the addition of the shield to the disc drive package increases the complexity of the enclosure mechanical design and consequently the cost of manufacture of the disc package.

FIG. 3 is a section view of a linear actuator in accordance with one embodiment of the present invention. In this embodiment the actuator housing 50 is provided with a magnetic flux transmission plate 52 on the face of the actuator near the disc 54 thereby providing a flux path within housing 50 as shown by flux lines 56 and 58 and resulting in a more efficient and shortened flux path. The opposite face of the actuator housing 50 is provided with a magnetic flux transmission plate 60 thereby fully containing the flux lines within the housing. Because of the shortened magnetic flux lines, the necessary iron required for providing flux paths is substantially reduced as compared with prior art actuators with equivalent magnetic flux densities. In the conventional design, casting or forging of the iron is required due to the ncessary wall thickness. However, the iron wall thickness in accordance with the present invention can be sufficiently thin whereby stamping and rolling fabrication methods can be employed with attendant reduction in manufacturing costs.

FIG. 4 is an exploded perspective view of a linear actuator in accordance with one embodiment of the invention such as illustrated in the cross section of FIG. 3. The cylindrical housing 50 of the actuator has the flux transmission plate 52 either permanently attached to the face of the housing or removeably attached by mechanical fasteners such as bolts. Integral with plate 52 and supported thereby are a plurality of iron fingers or guides 62 which fits inside slots 64 in bobbin 66 with running clearance. The bobbin 66 is made of non-ferrous material and includes the voice coil 68 wound on the periphery thereof for positioning in close proximity to the permanent magnets mounted to the inside surface of housing 50.

A carriage 70 for the magnetic head assembly 72 is attached to bobbin 66 by means of screws 74 whereby linear movement of bobbin 66 and voice coil 68 within housing 50 linearly moves the carriage 70 and magnetic head assembly 72 across the surface of disc 74. The carriage 70 is supported by and linearly moves on a rod 76 mounted in the lower support of the disc drive housing with bearings 78 rolling on guide plates 80 in conventional manner. The face of housing 50 which is opposite plate 52 is provided with an iron plate 60 for completing the magnetic flux path of housing 50. Plate 60 is preferably bolted to housing 50 for ease of removal in assembling the bobbin 66 in housing 50. A hole 76 is provided in plate 60 to accommodate limiter assembly for the carriage, such as disclosed in U.S. Pat. No. 4,237,504 supra.

By minimizing flux leakage in the linear actuator in accordance with the present invention a more compact disc file package is provided. Such a package is particularly advantageous for use with the smaller storage racks used for mini-computer and micro-computer systems. Because of the reduction in iron requirements due to the shortened magnetic flux lines, the actuator is considerably lighter in weight and more easily fabricated.

In particular, the linear actuator can be accommodated in the standard floppy disc sized package for driving a smaller disc (e.g. a 200 millimeter disc). Such a package measures only 4.62 inches in height, 8.55 inches in width and 14.25 inches in length. Heretofore, stepping motors have been required in such packages for driving magnetic head carriages. However, the use of stepping motors limits the number of data tracks on a disc surface to approximately 170 tracks per inch. A voice coil actuator utilizing track following servo control can accommodate up to 1,000 tracks per inch. Thus, the availability of a voice coil linear actuator, in accordance with this invention, in the smaller package allows greatly increased data storage capacity in a floppy sized disc and package.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A compact linear actuator for moving pickup heads relative to a disc in a magnetic disc drive comprising a generally cylindrical housing of a magnetic material including a plurality of magnets mounted to the inside surface of said housing, said housing being open at each end, a generally cylindrical bobbin including a coil wound on the periphery of said bobbin, said bobbin being positioned within said housing and linearly movable therein with said coil in close proximity to said plurality of magnets, an annular ring of a magnetic material having a central opening and providing first magnetic flux transmission means attached to one end of said housing in a peripheral portion of said housing to provide a magnetic path for said magnets and prevent magnetic flux leakage, a plate of a magnetic material providing a second magnetic flux transmission means attached to the other end of said housing to provide a magnetic flux path for said magnets and prevent magnetic flux leakage, and pickup head carriage means extending through said central opening and attached to said bobbin for linear movement with said bobbin.

2. A compact linear actuator for moving pickup heads relative to a disc in a magnetic disc drive comprising a generally cylindrical housing of a magnetic material including a plurality of magnets mounted to the inside surface of said housing, said housing being open at each end, a generally cylindrical bobbin including a coil wound on the periphery of said bobbin, said bobbin being positioned within said housing and linearly movable therein with said coil in close proximity to said plurality of magnets, an annular ring of a magnetic material having a central opening and providing first magnetic flux transmission means attached to one end of said housing in a peripheral portion of said housing to provide a magnetic path for said magnets and prevent magnetic flux leakage, a plate of a magnetic material providing a second magnetic flux transmission means attached to the other end of said housing to provide a magnetic flux path for said magnets and prevent magnetic flux leakage, and pickup head carriage means extending through said central opening and attached to said bobbin for linear movement with said bobbin and at least partially retractable within said housing through said central opening.

3. A linear actuator as defined by claim 2 and further including guide means integral with said annular ring and extending through said bobbin and providing magnetic flux paths through said bobbin between said ring and said plate.

4. A linear actuator as defined by claim 3 wherein said guide means comprises a plurality of fingers and said bobbin includes a plurality of passages for mating with said fingers.

5. A linear actuator as defined by claim 4 wherein said fingers are affixed to said annular ring and extend into said housing in spaced alignment with said magnets and form part of the magnetic flux path.

6. A compact sealed disc drive comprising an enclosure including a bottom support portion, a motor and spindle mounted in the surface of said bottom support portion, a magnetic disc within said enclosure mounted on said spindle and driven by said motor, magnetic heads for reading and recording data on said disc, a linearly driven carriage for supporting said head and moving said heads relative to the surface of said disc, and a linear actuator mounted in the periphery of said enclosure in close proximity to said disc for moving said carriage, said linear actuator including a generally cylindrical housing of a magnetic material including a plurality of magnets mounted to the inside surface of said housing, a generally cylindrical bobbin including a coil wound on the periphery of said bobbin and a plurality of slots extending therethrough, said bobbin being positioned within said housing and linearly moveable therein with said coil in close proximity to said plurality of magnets, guide means extending through said slots and providing magnetic paths through said bobbin, first magnetic flux transmission means including an annular ring of a magnetic material having a central opening attached to one end of said housing in a peripheral portion of said housing to provide a magnetic path for said magnets and prevent magnetic flux leakage, and second magnetic flux transmission means attached to the other end of said housing to provide a magnetic flux path for said magnet and prevent magnetic flux leakage, said carriage being attached to said bobbin for linear movement with said bobbin.

7. A compact sealed disc drive as defined by claim 6 wherein said guide means are fixed to said annular ring and extend into said housing in spaced alignment with said magnets.

8. A compact sealed disc drive as defined by claim 6 wherein said sealed disc drive measures approximately 4.62 inches high, 8.55 inches wide, and 14.25 inches long.

9. A compact sealed disc drive as defined by claim 6 wherein said carriage is at least partially retractable within said housing through said central opening.

* * * * *